US008285906B2

(12) United States Patent
Golka et al.

(10) Patent No.: US 8,285,906 B2
(45) Date of Patent: Oct. 9, 2012

(54) ALTERNATE USE OF COMPUTER STORAGE DEVICE BAYS

(75) Inventors: Kevin Golka, Kanata (CA); Steven Rhodes, Nepean (CA); Michel Leduc, Kanata (CA); Richard Martin, Hull (CA); Ronald Wellard, Kanata (CA)

(73) Assignee: Avaya Inc., Basking Ridge, NJ (US)

( * ) Notice: Subject to any disclaimer, the term of this patent is extended or adjusted under 35 U.S.C. 154(b) by 5008 days.

(21) Appl. No.: 10/278,693

(22) Filed: Oct. 23, 2002

(65) Prior Publication Data

US 2003/0046467 A1 Mar. 6, 2003

Related U.S. Application Data

(63) Continuation of application No. 09/195,008, filed on Nov. 18, 1998.

(51) Int. Cl.
*G06F 13/00* (2006.01)

(52) U.S. Cl. ........... 710/302; 710/300; 710/306; 710/64

(58) Field of Classification Search .......... 710/300–317, 710/8–19, 62–64, 72–73
See application file for complete search history.

(56) References Cited

U.S. PATENT DOCUMENTS

| 5,227,957 | A |   | 7/1993  | Deters |           |
|-----------|---|---|---------|--------|-----------|
| 5,727,184 | A | * | 3/1998  | Richter et al. | 710/62 |
| 5,740,378 | A | * | 4/1998  | Rehl et al. | 710/302 |
| 5,754,796 | A | * | 5/1998  | Wang et al. | 710/301 |
| 5,822,547 | A |   | 10/1998 | Bosch et al. |   |
| 5,822,551 | A | * | 10/1998 | Crane et al. | 710/307 |
| 5,896,513 | A | * | 4/1999  | Fisch et al. | 710/107 |
| 5,941,963 | A |   | 8/1999  | Charles et al. |   |
| 5,963,431 | A | * | 10/1999 | Stancil | 361/803 |
| 5,987,547 | A | * | 11/1999 | Panasik et al. | 710/301 |
| 6,011,687 | A |   | 1/2000  | Gluskoter et al. |   |
| 6,044,423 | A | * | 3/2000  | Seo et al. | 710/302 |
| 6,061,746 | A | * | 5/2000  | Stanley et al. | 710/10 |
| 6,078,112 | A | * | 6/2000  | Saunders et al. | 307/125 |
| 6,145,029 | A |   | 11/2000 | Deschepper et al. |   |
| 6,216,185 | B1 | * | 4/2001  | Chu | 710/303 |
| 6,223,250 | B1 | * | 4/2001  | Yokono | 711/114 |
| 6,249,828 | B1 | * | 6/2001  | Wallach et al. | 710/303 |
| 6,480,925 | B1 | * | 11/2002 | Bodo | 710/307 |
| 6,507,882 | B1 | * | 1/2003  | Golka et al. | 710/302 |
| 6,580,604 | B1 | * | 6/2003  | McAnally et al. | 361/685 |
| 7,103,753 | B2 | * | 9/2006  | Crane, Jr. | 712/33 |

OTHER PUBLICATIONS

Device Bay Interface Specification, Compaq, Intel, Microsoft, Revision 0.85, Feb. 5, 1998.

* cited by examiner

*Primary Examiner* — Raymond Phan
(74) *Attorney, Agent, or Firm* — Maldjian Law Group LLC; John P. Maldjian, Esq.; Alexander D. Walter, Esq.

(57) ABSTRACT

A module is provided for installation in a drive bay of a computer and is adapted to accommodate expansion circuitry rather than the electromechanical devices conventionally installed in drive bays. A system interface board is provided for insertion into an expansion socket on the computer's motherboard and is connected to the module, thus interfacing the expansion circuitry to the computer. The expansion circuitry can be greater in volume and is more accessible and more easily cooled than expansion circuitry installed in expansion sockets on the motherboard.

7 Claims, 2 Drawing Sheets

ALTERNATE USE OF COMPUTER STORAGE DEVICE BAYS

CROSS-REFERENCE TO COPENDING PATENT APPLICATIONS

This is a continatuation of Ser. No. 09/195,008, filled Nov. 18, 1998, now pending.

FIELD OF THE INVENTION

This invention pertains to digital computers, particularly to the arrangement of components within digital computers, and most particularly to novel use of bays provided for the insertion of data storage devices in digital computers.

BACKGROUND OF THE INVENTION

Typical arrangements of components within present day digital computers may be illustrated by the well-known IBM-compatible personal computer (PC). Within a mechanical enclosure, commonly known as the "case", there typically is a relatively large circuit board known as the "motherboard". The motherboard has several sockets, known as "expansion slots", into which smaller circuit boards may be plugged and through which the smaller circuit boards, known as expansion boards, may make contact with supply voltage and signal lines of the motherboard, thus becoming integral parts of the digital computer. Display adapters, network interfaces, modems, and the like are generally installed in computers as expansion boards; this imparts more flexibility of configuration than if those circuits' functions were integral to the motherboard.

Another class of components intended for discretionary installation in digital computers is storage devices, such as disk drives, compact disk read-only memory (CD ROM) drives, and the like. Storage devices are generally electromechanical in nature and thus have appreciable weight and bulk and thus do not lend themselves to being incorporated into electronic circuit boards, such as expansion boards. Therefore, a PC typically contains "drive bays" for accommodating such devices.

When adding electronic components on expansion boards to a computer to adapt it for certain applications, such as for telecommunications, it is often found that the electronics are of such bulk that there is not sufficient room for them or that the components must be crowded such that adequate cooling of them may not be attained.

Also, for applications such as telecommunications, voltages may be required that are not furnished within the computer, requiring an additional power converter unit which compounds the aforementioned space and cooling problems.

In addition, inserting cards in the motherboard requires powering down the computer and opening the case, which limits ease and flexibility of reconfiguration.

For applications such as telecommunications it is often necessary to make numerous external connections to the added circuit boards. This may prove difficult with boards installed in the expansion slots on the motherboards since they are contained inside the computer case and have very little exposed faceplate area. Component height is limited due to the typical pitch of the expansion sockets.

There have been attempts to solve these problems based on computers with large cases and large motherboards with bus extenders, but these solutions have proven inconvenient and expensive.

There is thus a need for a computer with economical provision for the insertion of a large volume-of expansion circuitry, without the necessity of powering down or dismantling the computer, and allowing easy connection of external cabling to the expansion circuitry.

It is thus an object of the present invention to provide an economical computer in which a large volume of expansion circuitry may be installed.

It is a further object of the present invention to provide a computer in which expansion circuitry may be installed without powering down, opening, or dismantling the computer.

It is another object of the present invention to provide a computer in which expansion circuitry including tall components may be installed.

It is a further object of the present invention to provide a computer in which external connections may easily be made to expansion circuitry.

It is yet another object of the present invention to provide a computer in which a large volume of circuitry may have access to air outside of the computer for cooling.

These and other objects of the invention will become apparent to those skilled in the art from the following description thereof.

SUMMARY OF THE INVENTION

In accordance with one practice of the present invention, these and other objects may be accomplished by the present system, in a computer having a motherboard and a drive bay for accommodating electromechanical peripheral devices, by installing expansion electronic circuitry into the drive bay and installing into the motherboard a system interface board in electrical communication with the expansion electronic circuitry.

A practice of the invention allows inserting expansion electronic circuitry to be installed without dismantling the computer.

In another practice of the invention the system interface board passes connections to the motherboard's signal paths or supply voltages straight through to the expansion electronic circuitry.

A practice of the invention provides connectors on the expansion electronic circuitry connectable to external circuitry without dismantling the computer.

Another practice of the invention makes the computer's supply voltages available to the external circuitry through the external connectors.

Another practice of the invention provides a voltage converter in the expansion electronic circuitry for producing voltages not available from the computer, and makes those voltages available to the external circuitry.

Other practices of the invention provide for passing signals between the expansion electronic circuitry and the external circuitry, in one or both directions, and to provide communication capability between the expansion circuitry and remote entities via the external circuitry.

Another practice of the invention provides isolation in the system interface board allowing expansion electronic circuitry to be removed or inserted without powering down the computer.

Other practices of the invention provide functional circuitry on the system interface board.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

The present invention overcomes the stated limitations of the prior art by facilitating installation of expansion electronic circuitry into the drive bays of a computer, originally intended for the installation of electromechanical devices such as hard-disk drives. The invention provides drive bay modules adapted for physical installation into the existing drive bays of a conventional PC chassis, and adapted to accommodate telecommunications controllers or other high-volume, high-heatload expansion circuitry within the module. The invention also provides a system interface board adapted for insertion into an expansion slot of the motherboard. The system interface board can be connected to multiple drive bay modules and interfaces the expansion circuitry contained in the drive bay modules to the motherboard.

Figure 1:
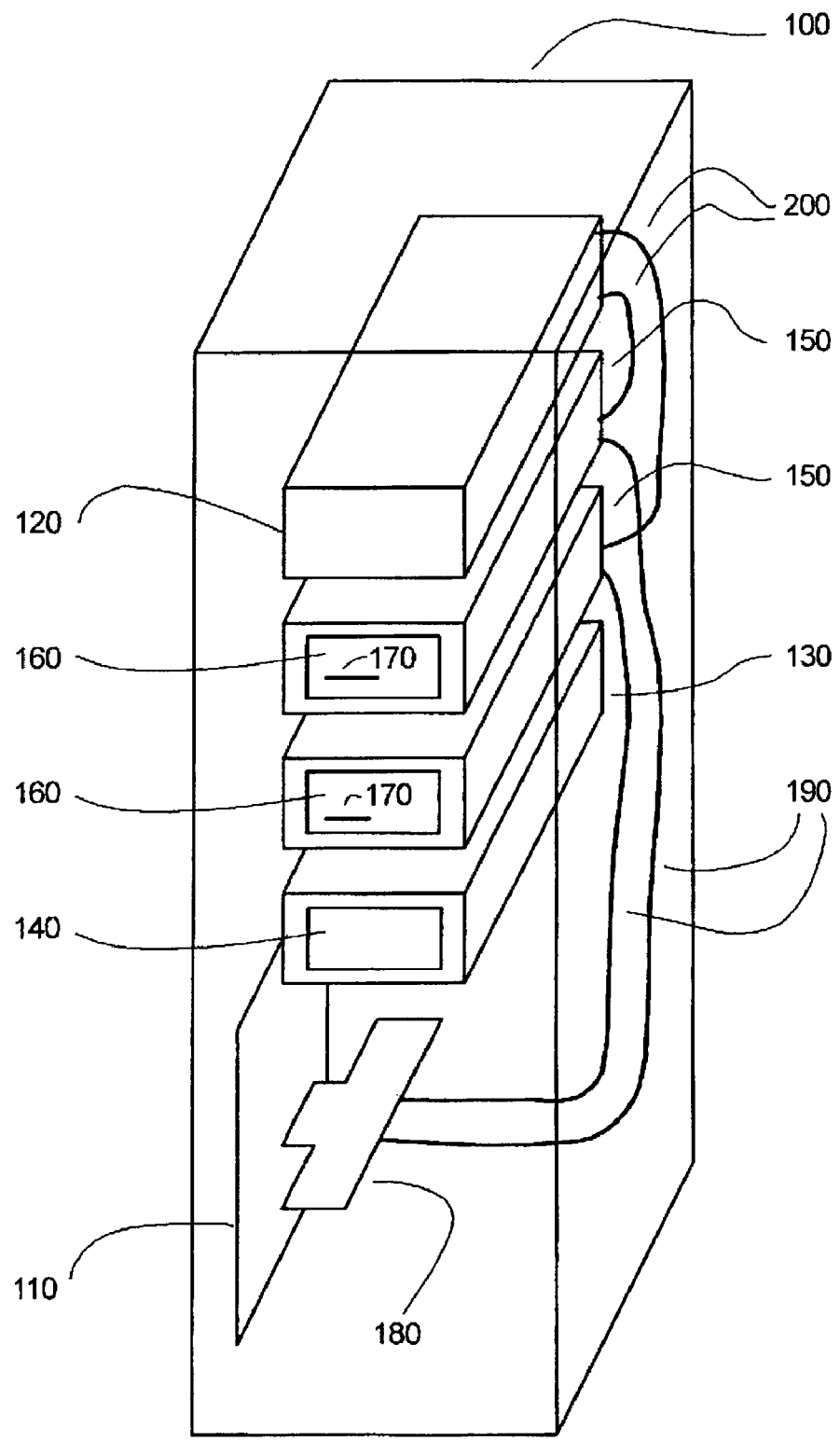
FIG. 1 is an isometric phantom view of a computer containing bays accommodating expansion electronic circuitry according to the present invention.

FIG. 1 depicts an embodiment of the invention. A conventional computer case 100 (shown as a phantom outline) contains a conventional motherboard 110 which contains the circuitry essential to the computer, and which also has a plurality of conventional expansion sockets (not shown) into which expansion boards may be plugged to expand the capabilities of the computer. Through the expansion sockets, the expansion boards may contact supply voltages and signal lines of the motherboard 110, thus becoming integral parts of the computer in a functional sense.

A conventional power supply 120 provides DC voltages needed by components of the computer. The voltages are distributed on paths not shown.

The case 100 typically contains multiple drive bays 130, suitable for the insertion of electromechanical devices such as a conventional hard-disk drive 140. Interfacing such an electromechanical device to the computer is typically accomplished by inserting into motherboard 110 a conventional expansion board (not shown) which is typically the companion interface and controller board to the electromechanical device 140, and running cables (not shown) from that expansion board to the electromechanical device 140. Powering the electromechanical device 140 is typically accomplished by connecting cables (not shown) from power supply 120 to the electromechanical device 140. Bay 130 typically is provided with apertures through which the cables may pass to connect with connectors provided on the electromechanical device 140.

In one practice of the present invention, electronic expansion modules 160, constructed in accordance with the invention, are inserted into one more device bays 150 instead of disk drives or other conventional electromechanical devices. Drive bays 150 may differ from conventional drive bays 130 in incorporating connectors and the like to facilitate the accommodation of expansion modules 160. System interface board 180 is provided for insertion into an expansion slot of motherboard 110; unlike conventional expansion boards, it passes ("straight through") connections to system voltages and data paths of computer 100 to cables 190 and on to expansion modules 160. If desired, functional circuitry may be provided as well on system interface board 180.

Several advantages are evident over the conventional scheme of inserting expansion electronics into mother board 110: components of greater height may be accommodated; a larger volume of electronics may be accommodated; greater cooling may be achieved; connectors 170 may be provided on the outboard side of modules 160 facilitating connection to external circuitry; the connectors 170 may provide not only signal to the external circuitry, but also power if required.

Apertures or trapdoors may be provided in case 100 for passing external connections. If a large amount of expansion circuitry is to be added to a computer, the case 100 may be made larger and a large number of bays 150 may be provided, at much less expense and complexity than would be required by the conventional methods of expanding the motherboard to provide more expansion slots.

Power may be provided to expansion module 160 through cables 200 from power supply 120. Some expansion electronics or external circuitry may require voltages not normally available in computer 100, in which case power supply 120 may be modified to provide the additional voltages or an additional power supply (not shown) may be provided, with the voltages reaching expansion module 160 through cables 200. Thus, no modification is required to the normal voltage distribution paths of computer 100 and motherboard 110. Alternatively, the expansion circuitry included in expansion module 160 may include a power converter to derive the requisite voltages from the voltages available from power supply 120. The present invention allows sufficient room and cooling capacity to facilitate such a power converter, whereas it might exceed space or cooling limitations were it to be installed in the conventional manner on the motherboard.

A standard "half-height" drive bay (5.25 inches wide by 1.7 inches high) provides space for a substantial volume of circuitry, which may include components significantly taller than might be accommodated on an expansion board in one of the expansion slots. If a great deal of expansion circuitry needs to be added, the scheme of the present invention permits construction of a computer with a larger case and a larger number of drive bays with simplicity and economy compared to constructing a computer with a large motherboard and a large number of expansion slots, with the requisite bus extenders.

The computer cabinet and the circuitry in such a module can be arranged so that the circuitry is accessible (as for installing or removing it, or as for making external connections to it) without opening the case of the computer. The matter of venting such circuitry to the outside (as for cooling) is simplified compared to the matter of venting circuitry installed in the motherboard's expansion slots. Space for making a large number of external connections to the circuitry is much more readily available under the present invention than under the conventional scheme of installing expansion boards on the motherboard.

The system interface board can be designed so as to electrically isolate the expansion circuitry in the module from the motherboard, permitting "hot" (i.e., without powering down the computer) insertion or removal of expansion circuitry in a module.

Figure 2:
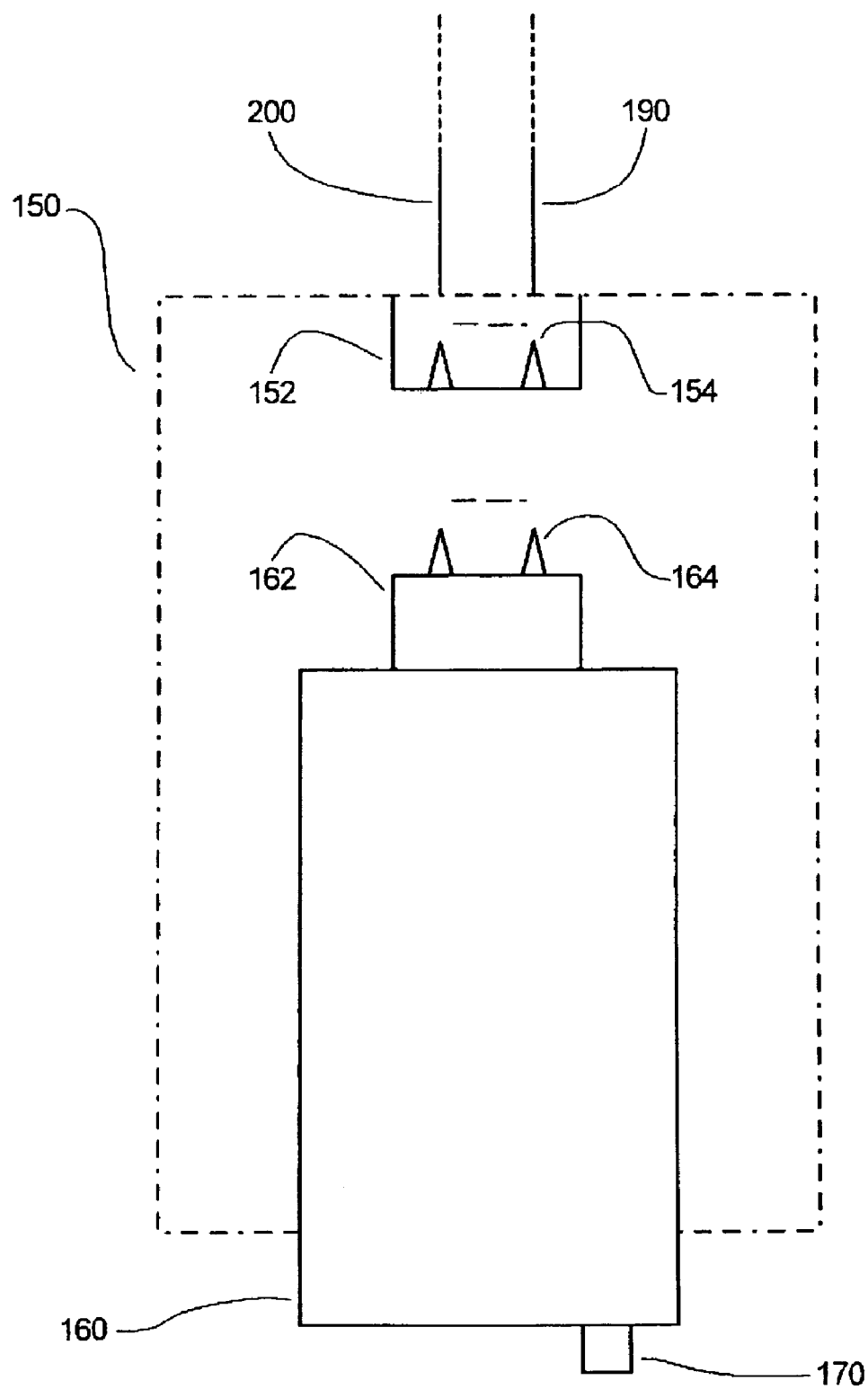
FIG. 2 is a view of one of the bays of the present invention.

FIG. 2 shows further detail of an embodiment of bay 150 with an expansion module 160 partially inserted. Relative to the orientation depicted in FIG. 1, FIG. 2 is a view from the right side of bay 150 and with the right-hand side panel of bay 150 cut away. Bay 150 is equipped with a socket 152 while module 160 is equipped with connector 162. Connector 162 and socket 152 are equipped with pins 164 and pin receptacles 154 respectively, oriented so as to mate when module 160 is fully inserted into bay 150, thus effecting interconnection of module 160 with voltages available on cable 200 and signal paths on cable 190.

In an alternative embodiment, connector 152 may be omitted with connector 162 being suitable for direct mating with cables 190 and 200.

It will thus be seen that the invention efficiently attains the objects set forth above, among those made apparent from the preceding description. In particular, the invention provides capability of incorporating a large volume of expansion circuitry into a computer without significant increase to the computer's electronic or electrical complexity, with enhanced accessibility to the expansion circuitry, with enhanced cooling and venting of the expansion circuitry, and with capability for "hot" insertion or removal of the expansion circuitry. Those skilled in the art will appreciate that the configuration depicted in FIGS. 1 and 2 provide a computer in which an arbitrarily large amount of expansion circuitry may be accommodated independent of limitations on the motherboard, with provision for easy connection to external systems, with ability to provide power to external circuitry, and with adequate cooling capability.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a computer having: a motherboard with one or more expansion sockets for the insertion of expansion boards, the expansion sockets enabling connection to the motherboard's signal paths and supply voltages; and at least one bay for accommodating electromechanical peripheral devices, an expansion system comprising:
   an expansion electronic circuitry module containing expansion electronic circuitry rather than electromechanical devices, said expansion electronic circuitry module being mechanically adapted for insertion in said at least one bay; and
   a system interface board in electrical communication with said expansion electronic circuitry module for insertion into an expansion socket on the motherboard,
   wherein said system interface board has pass-through paths for connecting the expansion electronic circuitry to signal paths and supply voltages of the motherboard.

2. The expansion system recited in claim 1 wherein said at least one bay is configured so that:
   a module may be inserted into said at least one bay without dismantling the computer.

3. A method of adding circuitry to a computer, the computer having a motherboard with one or more expansion sockets for the insertion of expansion boards, the expansion sockets enabling connection to the motherboard's signal paths and supply voltages, the method comprising:
   providing at least one bay for accommodating electromechanical peripheral devices;
   providing an expansion electronic circuitry module rather than an electromechanical device for insertion in a bay and for containing expansion electronic circuitry;
   providing a system interface board for insertion into an expansion socket on the motherboard and electrically connecting the system interface board to the expansion electronic circuitry, the system interface board having pass-through paths for enabling connection of the expansion electronic circuitry to the motherboard's signal paths;
   connecting the expansion electronic circuitry to supply voltages of the computer; and
   configuring said at least one bay so that said expansion electronic circuitry module may be inserted into said at least one bay without dismantling of the computer.

4. The expansion system recited in claim 1 wherein said expansion circuitry is selected from the group of expansion circuitry consisting of a display adapter, a network interface and a modem.

5. A method of adding circuitry to a computer, the computer having a motherboard with one or more expansion sockets for the insertion of expansion boards, the expansion sockets enabling connection to the motherboard's signal paths and supply voltages, the method comprising:
   providing at least one bay for accommodating electromechanical peripheral devices;
   providing an expansion electronic circuitry module rather than an electromechanical device for insertion in a bay and for containing expansion electronic circuitry;
   providing a system interface board for insertion into an expansion socket on the motherboard and electrically connecting the system interface board to the expansion electronic circuitry, the system interface board having pass-through paths for enabling connection of the expansion electronic circuitry to the motherboard's signal paths; and
   connecting the expansion electronic circuitry to supply voltages of the computer;
   wherein said providing an expansion electronic circuitry module comprises providing an expansion electronic circuitry module containing expansion circuitry selected from the group of expansion circuitry consisting of a display adapter, a network interface and a modem.

6. In a computer having: a motherboard with one or more expansion sockets for the insertion of expansion boards, the expansion sockets enabling connection to the motherboard's signal paths and supply voltages; and at least one bay for accommodating electromechanical peripheral devices, an expansion system comprising:
   an expansion electronic circuitry module containing expansion electronic circuitry rather than electromechanical devices, said expansion electronic circuitry module being mechanically adapted for insertion in said at least one bay; and
   a system interface board in electrical communication with said expansion electronic circuitry module for insertion into an expansion socket on the motherboard,
   wherein said expansion circuitry is selected from the group of expansion circuitry consisting of a display adapter, a network interface and a modem.

7. The expansion system recited in claim 6 wherein said at least one bay is configured so that:
   a module may be inserted into said at least one bay without dismantling the computer.

\* \* \* \* \*